United States Patent
Barczyk et al.

(10) Patent No.: US 10,150,919 B2
(45) Date of Patent: Dec. 11, 2018

(54) METHOD AND A SYSTEM FOR PROCESSING PLASTIC WASTE

(71) Applicant: MTT TECHNOLOGIES GESELLSCHAFT MIT BESCHRÄNKTER HAFTUNG (GMBH), Bern (CH)

(72) Inventors: Robert Barczyk, Ostrzeszow (PL); Ryszard Parosa, Wroclaw (PL)

(73) Assignee: MTT TECHNOLOGIES GESELLSCHAFT MIT BESCHRÄNKTER HAFTUNG (GMBH), Bern (CH)

( * ) Notice: Subject to any disclaimer, the term of this patent is extended or adjusted under 35 U.S.C. 154(b) by 276 days.

(21) Appl. No.: 14/891,361

(22) PCT Filed: May 15, 2014

(86) PCT No.: PCT/EP2014/059939
§ 371 (c)(1),
(2) Date: Nov. 16, 2015

(87) PCT Pub. No.: WO2014/184290
PCT Pub. Date: Nov. 20, 2014

(65) Prior Publication Data
US 2016/0122654 A1    May 5, 2016

(30) Foreign Application Priority Data

May 16, 2013  (PL) .......................................... 403916

(51) Int. Cl.
*C10B 53/07*       (2006.01)
*C10K 1/00*        (2006.01)
(Continued)

(52) U.S. Cl.
CPC .............. *C10B 53/07* (2013.01); *C10B 19/00* (2013.01); *C10B 27/06* (2013.01); *C10B 37/00* (2013.01);
(Continued)

(58) Field of Classification Search
CPC ......... C10B 19/00; C10B 27/06; C10B 37/00; C10B 53/07
See application file for complete search history.

(56) References Cited

U.S. PATENT DOCUMENTS 5,057,189 A * 10/1991 Apffel ..................... C09C 1/482
                                                  202/113
5,902,510 A *  5/1999 Balbaa ..................... H05B 6/78
                                                  219/698
(Continued)

*Primary Examiner* — Jonathan Miller
(74) *Attorney, Agent, or Firm* — Mark M. Friedman

(57) ABSTRACT

A method for processing of plastic and/or rubber waste to generate energetic gas comprising aliphatic hydrocarbons $C_1$-$C_4$, carbon oxide and hydrogen, wherein the waste may comprise halogens, sulphur, nitrogen and oxygen and may be contaminated by substances of inorganic origin comprising ceramic and metallic materials, the method comprising processing the waste in a pyrolysis process, wherein a powdered waste material is fed to a microwave drum reactor (102), where it is heated by microwaves while being moved through the reactor (102), the method comprising: conducting the pyrolysis reaction inside the reactor (102) at a temperature of 800-950° C. to obtain end products comprising gases, dust and a porous char of a large surface area having absorptive properties; separating the char from the other pyrolysis products by deposition; directing a portion, preferably a quarter, of the obtained char to a filter (105); directing the dust and gases to a gas cooling apparatus (103) comprising at least two synchronized screw conveyors, wherein the gases are cooled to a temperature of 120-160° C. and wherein the dust and the condensate are directed to
(Continued)

the filter (105) filled with the char; and feeding back the mixture of char, condensate and dust from the filter (105) to the microwave reactor (102).

5 Claims, 3 Drawing Sheets

(51) Int. Cl.
    *C10K 1/04*         (2006.01)
    *C10B 19/00*       (2006.01)
    *C10B 27/06*       (2006.01)
    *C10B 37/00*       (2006.01)
    *C09C 1/48*        (2006.01)

(52) U.S. Cl.
    CPC ................ *C10K 1/003* (2013.01); *C10K 1/04* (2013.01); *C09C 1/482* (2013.01); *Y02P 20/143* (2015.11)

(56) References Cited

U.S. PATENT DOCUMENTS

| | | | |
|---|---|---|---|
| 6,184,427 B1 * | 2/2001 | Klepfer | C10G 1/10 |
| | | | 201/2.5 |
| 7,629,497 B2 * | 12/2009 | Pringle | A61B 18/1815 |
| | | | 204/157.15 |
| 8,669,404 B2 * | 3/2014 | Shulenberger | C10B 47/44 |
| | | | 44/606 |
| 9,045,693 B2 * | 6/2015 | Wolfe | C10J 3/007 |
| 9,540,580 B2 * | 1/2017 | Van Thorre | B01J 19/126 |
| 9,545,609 B2 * | 1/2017 | Van Thorre | B01J 19/126 |
| 2010/0288618 A1 * | 11/2010 | Feerer | C10B 47/44 |
| | | | 202/118 |

\* cited by examiner

METHOD AND A SYSTEM FOR PROCESSING PLASTIC WASTE

TECHNICAL FIELD

This disclosure relates to processing waste and recovering energy, in particular plastic waste, such as car wreckage elements.

BACKGROUND

Waste of car wrecks is particularly difficult to recycle because of the variety of plastic materials contained therein, such as hard plastic elements, rubber, foams or cable systems. Moreover, these elements may include macromolecular compounds, i.e. hydrocarbon polymers such as: polyethylene, polypropylene, polymers containing halogens, i.e. poly(vinyl chloride), polychloroprene polytetrafluoroethylene, oxygen-containing polymers such as poly(ethylene terephthalate), poly(methyl methacrylate), polyoxymethylene; polymers containing nitrogen from the group of polyurethanes, polyamides, or polymers containing sulphur, i.e. vulcanised rubbers.

There are known various methods of waste incineration, the most popular including pyrolysis and gasification. In these processes, waste is preheated by diaphragms via reactor walls, in which the waste is utilised. Waste is converted to a gaseous or oil form. However, these processes generate a considerable amount of by-products, such as soot, which are problematic for further recycling.

Waste can be utilized by a pyrolysis process. Pyrolysis involves thermal decomposition of organic matter in an anaerobic atmosphere or in reduced level of oxygen. High-temperature pyrolysis, in the reaction temperature range from 500° C. to 1600° C. (which is higher than in low-temperature pyrolysis), allows thermal decomposition of carbon polymers contained in waste to generate synthesis gas.

Another known process is gasification of waste, wherein pure oxygen is used in the last stage of the process, which enables to achieve reaction temperature, at which the waste residues can be entirely burned. In that process, air, oxygen and water vapour can be used to achieve partial oxidation. Gasification can be carried out in reactors of various types, such as rotary kilns, fluidised-bed boilers or boilers with moving or circulating bed.

The conventional pyrolysis methods, which involve heating the material through walls of a process chamber have a number of disadvantages that limit their scope of application. The temperature of the process chamber walls is the highest in the chamber and, which causes layers of soot, dust and tar to settle on the walls, which significantly reduces the transfer of heat to the material. The efficiency of energy transfer to the material is reduced; the duration of the process is prolonged and the pyrolysis process inside the chamber is uneven (the rate of degradation is different in different areas of the process chamber). In addition, there occur strong corrosive processes, which reduce the lifetime of equipment. Moreover, it is difficult to control the process temperature conditions; therefore, the quality of obtained gases is often low and varies during the process.

There are also known other methods of polymer waste thermal decomposition, including use of microwave energy.

A U.S. Pat. No. 5,084,140 discloses a method for destruction of macromolecular waste, wherein the waste (which is not itself susceptible to microwave heating and may be, for example, plastics or polychlorinated biphenyl) is mixed with pulverulent carbonaceous material, which comprises elemental carbon or is degradable by microwave irradiation to elemental carbon (such as waste tire material). The mix is subjected to microwave irradiation in an inert atmosphere to cause pyrolysis of the plastics. Pulverized elemental coal that forms fluidised bed is heated with microwaves to a temperature of at least 400° C. and pulverised plastics are introduced into the fluidised bed, which are subjected to pyrolysis in the fluidised bed by the transfer of heat to the powdered particles of utilised plastic material. Pyrolysis products are essentially gases and liquid hydrocarbon fractions that can be used as a source of energy, whereas solid fraction hydrocarbons formed as by-products are fed back to the pyrolysis process.

A US patent application US20020189928 discloses a process for microwave destruction of harmful agents and waste. The waste is subject to microwave impact in the presence of a catalyst, such as activated carbon, carbon soot, charcoal or metal carbides or/and water and gas, for example: air. In the case of use of active carbon as the catalyst, the process is carried out under conditions of temperature near the room temperature and atmospheric pressure. Waste can be disposed in a form of solid, liquid or gaseous waste.

A US patent application US20040054240 discloses a medical waste treatment unit, wherein organic material is subject to polymer degradation in an installation comprising three chambers. In the first chamber, the waste is weighed and the first chamber is mixed with oxygen. Then the organic material is introduced to the second chamber, where it is sterilised and depolymerised non-pyrolytically under microwave effect in an anaerobic atmosphere, whereas the gases produced in the process are purified in a scrubber. After that, the utilised material is cooled and milled in the third chamber to a form, in which it can be stored.

There is a need to provide an alternative method of processing plastic waste by pyrolysis using microwave energy.

SUMMARY

Particular embodiments presented below relate to a method for processing of plastic and/or rubber waste to generate energetic gas comprising aliphatic hydrocarbons $C_1$-$C_4$, carbon oxide and hydrogen, wherein the waste may comprise halogens, sulphur, nitrogen and oxygen and may be contaminated by substances of inorganic origin comprising ceramic and metallic materials, the method comprising processing the waste in a pyrolysis process, wherein a powdered waste material is fed to a microwave drum reactor, where it is heated by microwaves while being moved through the reactor, the method comprising: conducting the pyrolysis reaction inside the reactor at a temperature of 800-950° C. to obtain end products comprising gases, dust and a porous char of a large surface area having absorptive properties; separating the char from the other pyrolysis products by deposition; directing a portion, preferably a quarter, of the obtained char to a filter; directing the dust and gases to a gas cooling apparatus comprising at least two synchronized screw conveyors, wherein the gases are cooled to a temperature of 120-160° C. and wherein the dust and the condensate are directed to the filter filled with the char; feeding back the mixture of char, condensate and dust from the filter to the microwave reactor.

In some embodiments, the method comprises introducing the gas mixture having a temperature 120-160° C. from the gas cooling apparatus to a gas purifying system comprising a scrubber, to purify the gas from chlorine, fluorine and sulphur.

In some embodiments, the method further comprises directing the gas mixture from the scrubber to the charcoal filter.

Particular embodiments relate to a system for processing of plastic and/or rubber waste to generate energetic gas comprising aliphatic hydrocarbons $C_1$-$C_4$, carbon oxide and hydrogen, wherein the waste may comprise organic elements and may be contaminated by ceramic and metallic materials, the system comprising: an apparatus for crushing the waste material; a microwave drum reactor for processing the crushed waste material, having a ceramic lining and microwave radiant heaters and connected to a solid products tank and to a gas cooling apparatus comprising a system for absorbing condensing substances, the cooling apparatus being connected with a filter filled with char and with a gas purifying system that is connected with a charcoal filter connected with a gas tank; wherein the gas cooling apparatus comprises a heat exchanger having inlet and outlet coolant stub pipes for cooling a chamber, inlet and outlet stub pipes for providing a mixture of gases and dust to the chamber in which there are mounted at least two screw conveyors operating synchronously to transport the mixture of dust and gases and condensate, driven by a motor, and further comprising at least one screw conveyor for transporting the condensate and a tank with char to collect the condensate, wherein the tank with the char is connected to the microwave reactor to feed back the char to the microwave reactor.

In some embodiments, the screw conveyors are positioned in parallel to each another and to the walls of the chamber, such that their spiral surfaces overlap and contact the inner walls of the chamber.

It should be understood that the aforementioned embodiments are merely example implementations, and that claimed subject matter is not necessarily limited to any particular aspect of these example implementations.

BRIEF DESCRIPTION OF DRAWINGS

The method and system for processing plastic waste is shown by means of example embodiments on a drawing, in which.

DESCRIPTION OF EMBODIMENTS

Figure 1:
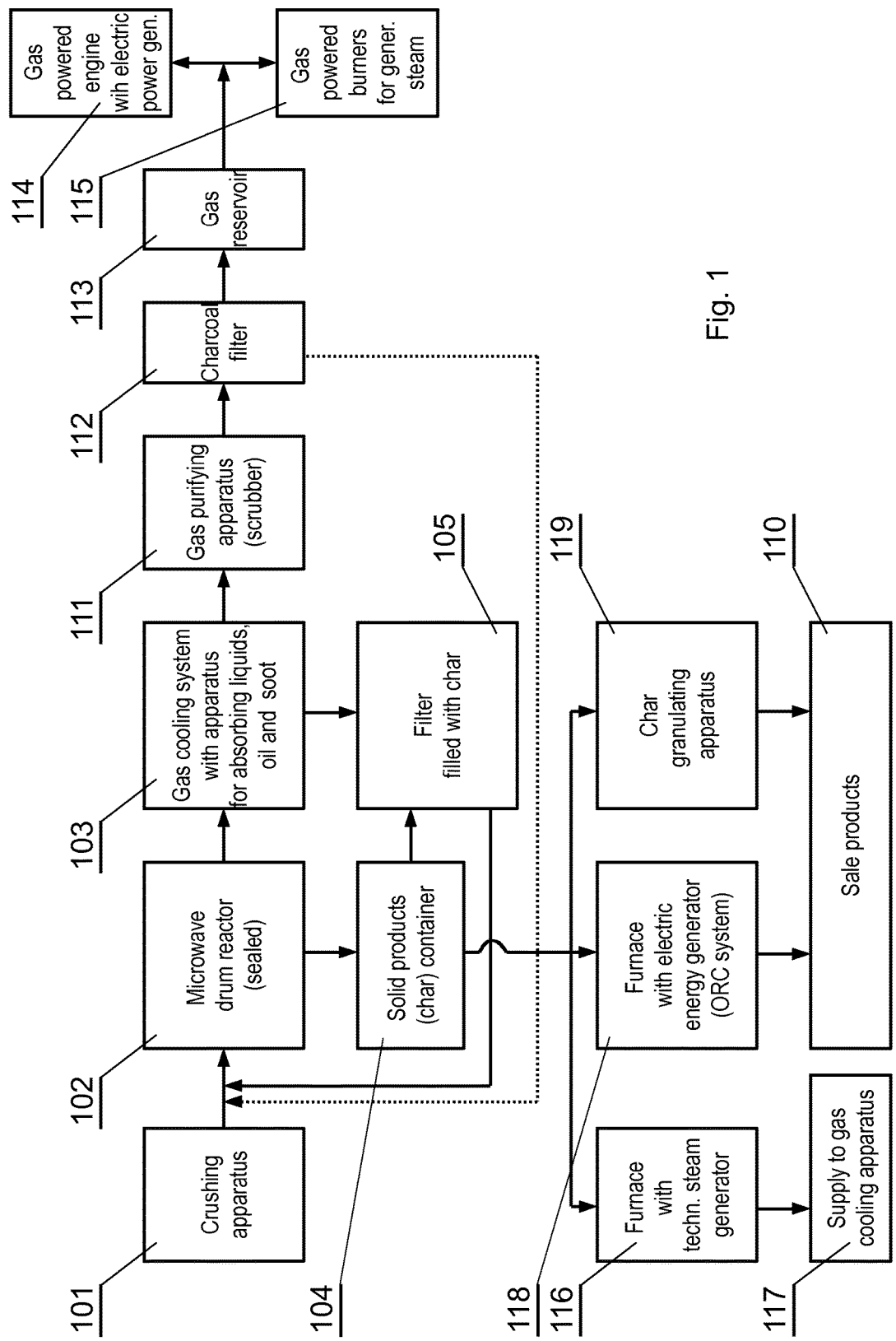
FIG. 1 presents a schematic diagram of a process line for processing plastic waste.

FIG. 1 is a schematic diagram of a process line for processing plastic waste. Batch material (plastic waste) is powdered in a crusher 101 to unify its composition and fed to a sealed chamber of a microwave reactor 102, having a drum with internal ceramic lining. In the reactor drum 102, in an atmosphere of gases released in the gasification process and at deficient amount of oxygen, the material moves within the rotating drum and is heated by microwave energy to a temperature of 800° C. to 950° C.

Figure 3:
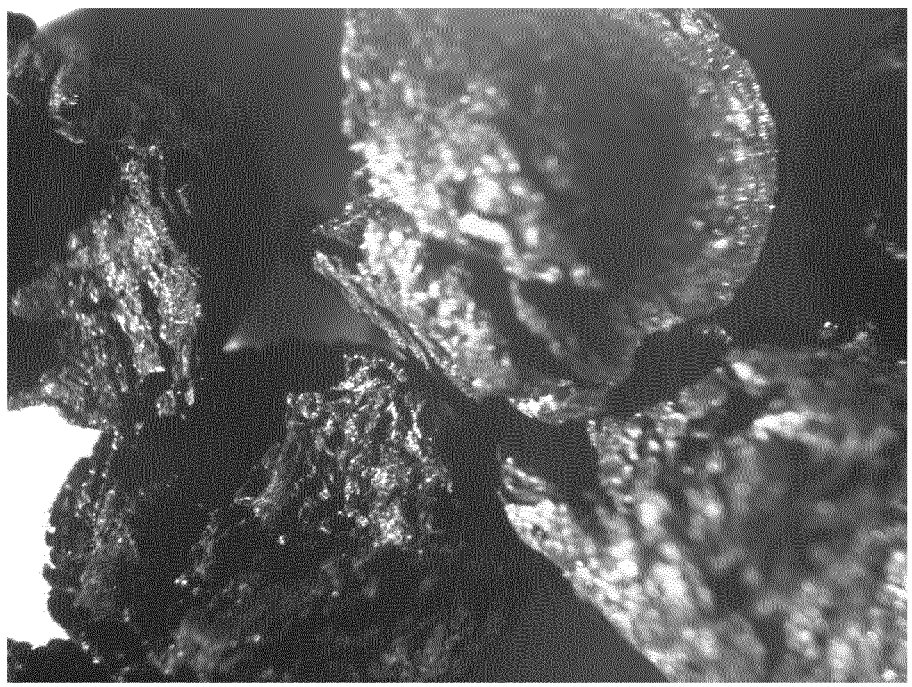
FIG. 3 presents a photograph of char.

During the heating stage, microwave energy is introduced to the waste material contained in the reactor drum. By absorbing the energy of electromagnetic microwaves, the material heats up. In the preliminary heating phase, when the temperature is below 800° C., the plastic waste is melt and degassed to release liquid and gaseous hydrocarbon fractions. The microwave energy enables decomposition of the weakest bonds in the chains of macromolecules, i.e. the bridges containing heteroatoms, including: oxygen, nitrogen, sulphur and methylene bridges that lead initially to form reactive radicals, which, as a result of further reactions, form a stable gaseous fraction containing aliphatic hydrocarbons $C_1$-$C_4$ and hydrogen and carbon oxide in the presence of both polymers and inorganic compounds that contain oxygen in the waste material. During further heating at temperatures above 800° C., polymerisation and condensation reactions occur at the presence of condensated fractions and macromolecules, which form a solid char (carbonisation product) and gaseous hydrocarbons, which causes swelling of the solid char and develop a porous surface of the char. An example photograph of char obtained in the process shown in FIG. 3.

The formation of char of a porous structure is the result of the microwave energy acting on the particles of formed char and on the ceramic lining of reactor, which prevents slagging of the reactor walls. The microwaves are absorbed by the formed char, which causes release of gases in its entire volume and swelling of the heated material structure. The high temperature to which the material is heated in the microwave reactor and the effect of swelling of solid fractions enables to produce inside the reactor chamber only powdery char and gaseous fractions. No liquid or tarry fractions settle on the surface of the drum 102, which is the a significant advantage of the presented method. The char (carbonization product) is collected in a tank 104. The char obtained as a by-product of the pyrolysis of waste constitutes only a few percent of the total waste introduced into the reactor (typically from 5% to 15%, depending on the composition of waste). Preferably, a quarter of the char from the tank 104 is further directed to a char filter 105, where it is used to absorb hydrocarbons liquefied in the gas cooling apparatus 103. The other portion of the char, having complex porous structure and adsorptive features, after being subject to additional treatments may be used in an oven having a steam generator 116, connected to the input of the gas cooling apparatus, or in an oven with an electricity generation system (an ORC system) 118, or in a pelleting machine as a raw material for sale 110. The char may also be used as a raw material for production of active carbon. The char from filter 105 absorbs liquid and tarry fractions (and others) from the cooling apparatus 103 of gases produced in the microwave reactor 102. After the char soaks these substances, it is fed back to the microwave reactor 102, wherein these substances evaporate at a high temperature and degrade further into simpler hydrocarbons.

Hot gases from the microwave reactor 102, having a temperature of 800-950° C., are introduced to the gas cooling apparatus 103, wherein they contact its cold walls and reduce their temperature to 120-160° C. In the course of cooling of the gas mixture, various liquid hydrocarbon and tarry fractions are precipitated and are deposited on the walls of the system 103. Inside the gas cooling apparatus 103 there are mounted two or more screw conveyors which collect the deposited liquid fractions and tarry substances from the walls and move them to the filter 105 at the bottom of the tank, which is filled with the char produced in the microwave reactor. The char, having a very large absorption surface, captures the condensed, high-energetic liquid and tarry fractions formed in the high-temperature pyrolysis process as the result of incomplete decomposition of polymers into simple hydrocarbons, due to side radical reactions. Therefore, the char is an effective filter that "captures" the so-called heavy hydrocarbons, tarry substances and dusts.

The filtering substance 105 is periodically fed back into the microwave reactor 102, wherein the hydrocarbons absorbed on the char are decomposed into simple hydrocarbons, hydrogen and carbon oxide.

The adsorption of hydrocarbon substances enables to eliminate hazardous substances formed in conventional waste gasification systems, such as dust, tar and complex hydrocarbons, including hazardous aromatic hydrocarbons. Double or triple thermal decomposition of such complex substances using microwaves at a temperature above 800° C. causes a decay to fractions of simple substances such as methane, carbon oxide and hydrogen with small amount of higher gaseous fractions that also contain useful hydrocarbons (butane, propane).

The cooled gases having a temperature of 120-180° C. are input from the cooling apparatus 103 to a cleaning system 111 (a so-called scrubber), wherein chlorine, fluorine and sulphur compounds, as well as simple compounds of these elements, such as hydrogen chloride, are absorbed. Preferably, a so-called hot scrubber (SNCR) is used, involving injection of ammonia ($NH_3$) into the chamber, where ammonia is mixed in a turbulent manner with gas that contains chlorine, fluorine, sulphur compounds and simple compounds of these elements. During chemical purification of gases, a solid product (sal ammoniac) is precipitated, which can be used for agricultural applications.

The purified gases are introduced to a gas tank 113 by means of another carbon filter 112 and then they can be supplied to an engine 114 or burned in a chamber 115 to produce hot gases or process steam. The carbon filter 112 is periodically replaced, while a used filter may be introduced to the microwave reactor chamber 102 for thermal utilisation.

The process described above allows to obtain a highly-energetic gas mixture that contains: methane (25-30%) aliphatic hydrocarbons $C_1$-$C_4$ (10-25%), carbon oxide (20-30%), hydrogen (7-20%). That mixture may be used as a source of energy, e.g. for a combustion engine.

The process described above is waste-free and results in an energetic gas, which can be transformed to heat and electricity. The process allows utilisation of noxious waste, including plastics that contain halogens, oxygen, nitrogen and even sulphur. Due to the microwave radiation acting on the waste inside the ceramic drum 102 and by heating waste to high temperatures, the parameters of the pyrolysis process are unique and not achievable by other methods of conventional high-temperature or low-temperature pyrolysis or gasification methods.

Figure 2:
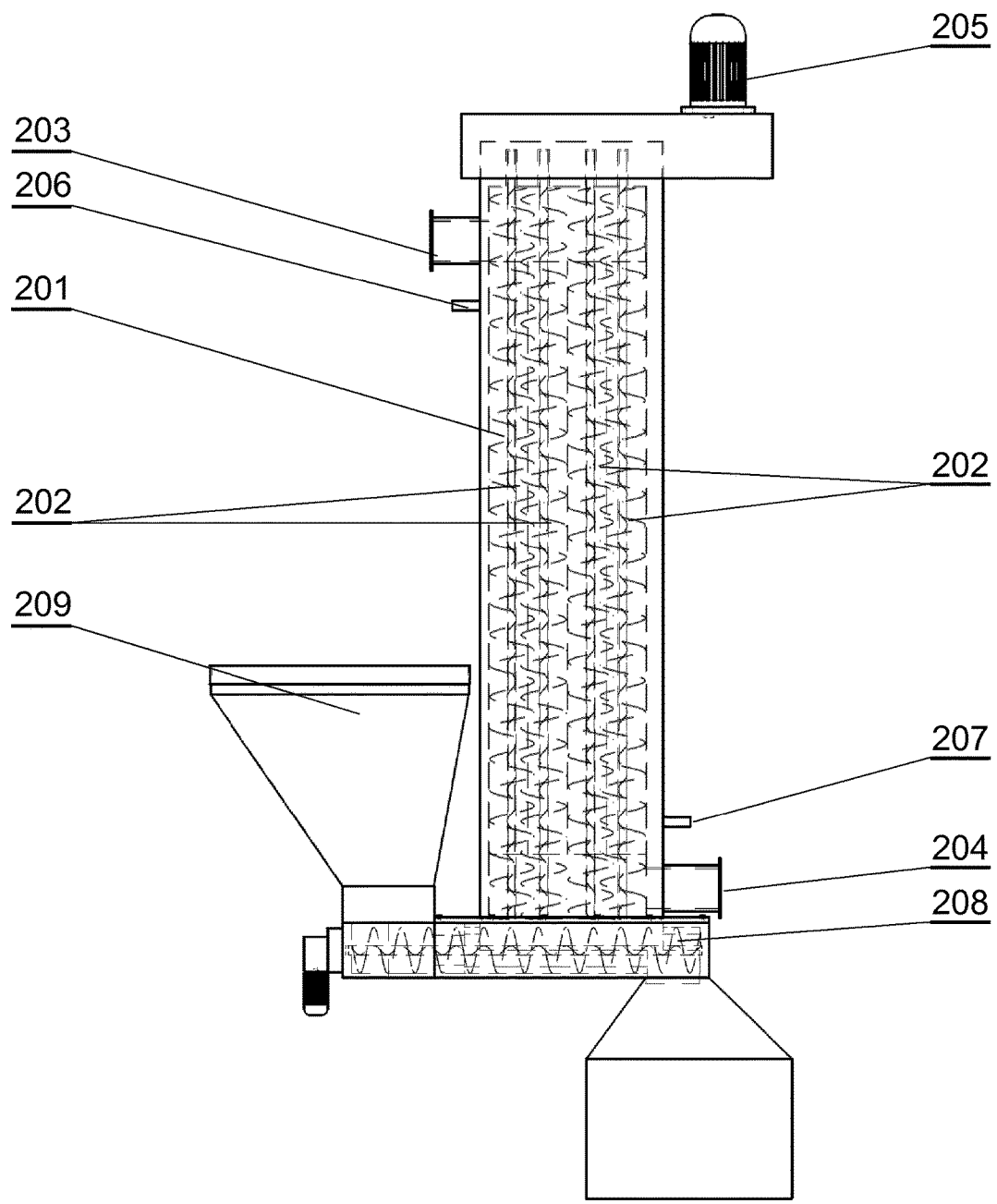
FIG. 2 presents a gas cooling apparatus.

FIG. 2 presents a structure of the gas cooling apparatus 103. It has a chamber 201, preferably made from a metal plate. The post-reaction mixture of gases and dusts at temperature of 800-950° C. output from the reactor 102 is fed into the chamber 201 through a stub pipe 203. In the chamber 201, the post-reaction mixture is moved along the walls of chamber 201 by at least two synchronously working screw conveyors 202 driven by a motor 205. The post-reaction mixture is outlet from the gas cooling apparatus 103 through a stub pipe 204. While transported by the screw conveyors 202 inside the chamber 201, the post-reaction mixture is cooled to a temperature of 120-180° C. at the outlet of the stub pipe 204, preferably 140-150° C. Such temperature is optimal to for the next gas purification stage in the scrubber 111. Cooling the mixture in the cooling apparatus 103 is effected through the walls of chamber 201. Water or other substances, that enable to cool the mixture by 700-800° C. can be selected as a coolant. The coolant can be input through an input stub pipe 206 and output through an outlet stub pipe 207. Moreover, cooling can be effected by co-flow or counter-flow with the use of shell or tube heat exchangers, at the same time. Any conventional heat exchanger can be applied here. When cooling the post-reaction mixture of gases and particulates of organic and inorganic origin, hydrocarbons of higher molecular weight (of more than 10 carbon atoms in the molecule) condense on the walls of the chamber 201, as well as dust and soot precipitate. The set of screw conveyors that transport the gas mixture inside the chamber 201 is constructed in a way that allows a turbulent flow of the gases and contact of the entire volume of the mixture with walls of chamber 201, which provides efficient heat exchange. In addition, the screw conveyors 202 are mounted in parallel to each other and to the walls of the chamber 201, in a distance enabling mutual (complementary) overlapping of helical surfaces of each screw conveyor 202 and contact of spiral edges of each screw conveyor with the walls of the chamber 201, which prevents clogging of the conveyors by the condensate of hydrocarbons and accumulated dust. A clog comprising hydrocarbon condensate and dust formed on the surface of one screw conveyor will be moved by the surface of its neighbouring conveyor. Moreover, such arrangement of the screw conveyors prevents built up of a condensate of hydrocarbons and dust on the walls of the chamber 201, which would reduce the efficiency of the heat exchange process while cooling. The presented method of gas cooling enables separation of the microwave pyrolysis reaction by-products (the mixture of hydrocarbons of high molecular weight (more than 10 carbon atoms) and the dust) from the main products: the energetic gas (containing hydrocarbons $C_1$-$C_4$, hydrogen) and carbon dioxide (produced when the waste substrates contain oxygen). The char that composes a mixture of liquefied hydrocarbons, soot and dust of a semi-liquid consistency, can be transported by a screw conveyor 208 to a char tank 209, continuously or periodically, wherein the condensation products and the char are mixed, and after that the mixture is introduced to the microwave reactor 102, wherein the hydrocarbons contained in the mixture are subject to further degradation to products of lower molecular weight. The carbon that is a primary ingredient of the char is partially burnt under the conditions of high deficiency of oxygen inside the reactor 102. The combustion reaction, due to its exothermic nature, induces increase of temperature inside the microwave reactor 102, which facilitates the waste pyrolysis process.

In the method described above, the heating of the gasified material is effected in the entire volume of the material, and it does not involve the adverse processes of slagging on the reactor walls. The walls of the process chamber (in this case: the inner wall of the rotating drum) are made of ceramic, which makes it prone to adverse processes of corrosion of the wall surfaces. The produced material does not adhere to these walls and there are forming no layers of tarry and inorganic substances nor particulate matter. The processed material becomes swelled due to the evaporation of gases from the interior of the processed material. As a result, the solid product of the process—the char—has a large surface and therefore it can be used as a filter to absorb oils and other substances, as well as a raw material for production of activated carbon.

While the system and method presented herein have been depicted, described, and have been defined with reference to particular preferred embodiments, such references and examples of implementation in the foregoing specification do not imply any limitations. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for processing of plastic and/or rubber waste to generate energetic gas comprising aliphatic hydrocarbons $C_1$-$C_4$, carbon oxide and hydrogen, in a pyrolysis process, wherein a powdered waste is fed to a microwave drum reactor, where the powdered waste is heated by microwaves while being moved through the reactor, the method comprising:
  conducting the pyrolysis reaction inside the microwave drum reactor at a temperature of 800-950° C. to obtain end products comprising gases, dust and a porous char of a large surface area;
  separating the porous char from the other end products by deposition;
  directing a portion of the porous char to a filter;
  directing the dust and the gases to a gas cooling apparatus comprising at least two synchronized screw conveyors, wherein the gases are cooled to a temperature of 120-160° C. and wherein the dust and a condensate are directed to the filter filled with the porous char; and
  feeding back the mixture of the porous char, the condensate and the dust from the filter to the microwave reactor.

2. The method according to claim 1, further comprising introducing the gas mixture having a temperature 120-160° C. from the gas cooling apparatus to a gas purifying system comprising a scrubber, to remove chlorine, fluorine and sulphur from the gas.

3. The method according to claim 2, further comprising directing the gas mixture from the scrubber to a charcoal filter.

4. A system for processing of plastic and/or rubber waste to generate energetic gas comprising aliphatic hydrocarbons $C_1$-$C_4$, carbon oxide and hydrogen, the system comprising:
  an apparatus for crushing the waste to obtain a crushed waste;
  a microwave drum reactor for processing the crushed waste, having a ceramic lining and microwave radiant heaters and connected to a solid products tank and to a gas cooling apparatus, the cooling apparatus being connected with a filter filled with char and with a gas purifying system that is connected with a charcoal filter connected with a gas tank;
  wherein the gas cooling apparatus comprises a heat exchanger having inlet and outlet coolant stub pipes for cooling a chamber, inlet and outlet stub pipes for providing a mixture of gases and dust to the chamber in which there are mounted at least two screw conveyors operating synchronously to transport the mixture of dust and gases and condensate, driven by a motor, and further comprising at least one screw conveyor for transporting the condensate and a tank with char to collect the condensate, wherein the tank with the char is connected to the microwave reactor to feed back the char to the microwave reactor.

5. The system according to claim 4, wherein the screw conveyors are positioned in parallel to each another and to the walls of the chamber, such that spiral surfaces of the screw conveyors overlap and contact the inner walls of the chamber.

* * * * *